UNITED STATES PATENT OFFICE.

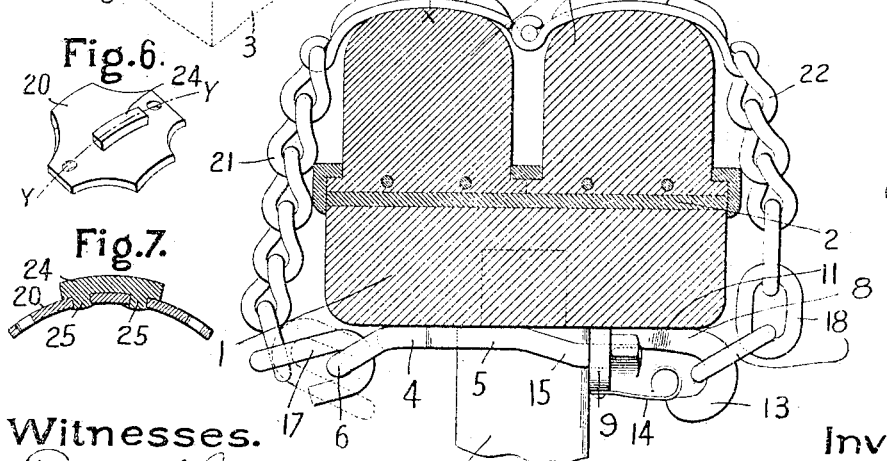

JOHN A. McDONALD, OF WINTHROP, MASSACHUSETTS, ASSIGNOR TO JULIUS R. PECK, OF BROOKLINE, MASSACHUSETTS.

SKID-CHAIN.

1,091,437.  Specification of Letters Patent.  Patented Mar. 24, 1914.

Application filed December 1, 1913. Serial No. 803,884.

*To all whom it may concern:*

Be it known that I, JOHN A. MCDONALD, a citizen of the United States, residing at Winthrop, county of Suffolk, State of Massachusetts, have invented an Improvement in Skid-Chains, of which the following description, in connection with the accompanying drawing, is a specification, like characters on the drawing representing like parts.

This invention relates to skid chains and has for its object to provide a skid chain which is especially adapted for use on motor trucks and the use of which does not entail any appreciable wear on the tire.

Some embodiments of my invention will first be described and then the novel features thereof will be pointed out in the appended claim.

Referring to the drawings wherein I have illustrated some selected embodiments of my invention which disclose the principle thereof, Figure 1 is a sectional view through a rim showing my skid chain applied thereto; Fig. 2 is a perspective view of the attaching device; Fig. 3 is a view similar to Fig. 1 showing a different embodiment of the invention; Fig. 4 is a diagrammatic view showing the operation of the skid chain; Fig. 5 is a section on the line $x$—$x$, Fig. 3. Fig. 6 is a perspective view of a wear plate of different construction than that shown in Fig. 3; and Fig. 7 is a section on the line $y$—$y$, Fig. 6.

One of the objects of the invention is to provide a novel skid chain attachment so constructed that under normal conditions the chain is loosely resting against the tire and does not, therefore, subject the tire to any wear, but when the skid chain is brought into use the strain thereon will be transmitted directly to the rim without subjecting the spokes to any stress.

In the drawings 1 indicates a wheel felly having a tire 2 thereon, which tire is herein shown as the ordinary dual tread solid rubber tire.

3 designates the spokes of the wheel.

My invention comprises a skid-preventing member which may be in the form of a chain or plate and a novel fastening for securing this skid-preventing member to the wheel.

My improved fastening is best seen in Fig. 2, and it comprises a yoke-shaped member 4 having two arms 5 that are adapted to embrace a spoke 3 and having an ear or extension 6, the end of which is preferably offset slightly, as shown in Figs. 1 and 2, and is provided with an opening or eye 7. This yoke-shaped member 4 is provided with a flat face adapted to rest against the inside of the rim, as clearly shown in Fig. 1. The other member 8 of the fastening device is a hook member which is provided with a head 9 adapted to engage one side of the spoke and is also provided with two apertures 10 through which the ends of the arms 5 project. The face 11 of this hook member 8 is flat and is adapted to rest against the inside of the rim and the top face 12 of the head 9 also rests against the inside of the rim. The hook member is provided with the hook portion 13 which preferably has a spring keeper 14 associated therewith. The arms 5 are shown as offset slightly, as at 15, so that the upper face of the yoke member 4 may stand in the same plane as the face 11 of the hook member 8.

In Fig. 1 the skid-preventing device is in the form of a chain 16 which is provided with a hook 17 at one end to detachably engage the eye 7 and with one or more links 18 at the other end adapted to engage the hook 13. The construction is such as to permit of the chain being readily applied to or removed from the attaching device. In applying the chain to the attaching device the hook 17 is first introduced into the eye 6, as shown by dotted lines Fig. 3 and then the chain is placed up over the tire 2 and one of the links 18 is hooked into the hook 13. The chain is of sufficient length so that when it is applied to the tire, as shown in Fig. 1, it will be somewhat slack, there being sufficient slackness to permit the links 18 to hook over the hook 13 or be disconnected therefrom. With such a construction the chain 16 will simply lie loosely on the tire, as shown in Fig. 1, without binding the latter or causing any wear to occur. In fact, as soon as the wheel starts revolving the centrifugal force will tend to throw the chain out from contact with the surface of the wheel. When the chain strikes the ground the wheel then rolls onto the chain, as shown in Fig. 4, and the chain operates as usual to prevent the wheel from slipping.

The strain to which the chain is subjected due to the traction of the wheel is transmitted through the chain directly to the fastening device and since the latter rests flatly against the inside of the rim this strain all comes on the rim instead of on the spoke. This is an important feature of my invention because in a truck wheel the strain to which the skid chains are subjected is a severe one, and if this strain were transmitted to the spokes instead of to the rim there would be danger that the spokes would become broken. By my construction, however, all the strain comes directly on the rim which is amply able to stand it.

Another feature of my invention lies in the fact that the fastening device is situated entirely within the rim so that when the chain is removed the device is not in the way and makes no undesirable projection on the wheel. This is an important feature because it obviates the necessity of removing the fastening device whenever the chains are not needed. As a matter of fact I contemplate that the fastening device will remain permanently secured on the wheel and that the chains will be carried about in the truck ready for use, so that if they are needed at any time either before the truck starts on a trip or in the middle of a trip, they can be readily applied to the wheel by simply hooking the hooks 17 into the eyes 7 and then hooking one of the links 18 onto the hook 13.

Instead of using a chain, as shown in Fig. 1, I may employ a skid-preventing device, such as shown in Fig. 3, which comprises plates or members 20 which are curved to fit the exterior contour of the tire and which have attached thereto short chains 21, 22 that are adapted to be secued to the fastening device. The chain 21 is provided with the hook 17 similar to the hook 17 shown in Fig. 1, and the chain 22 is provided with the links 18 adapted to hook over the hook 18. The outer faces of the members 20 are preferably provided with ridges or corrugations 23 so as to make a non-slipping surface. This device can be applied to or removed from the wheel in exactly the same manner as the chain 16. The principal difference between the two devices is that in the construction shown in Fig. 3, the portion of the skid-preventing member that engages the tread of the tire is made of flat plates instead of in the form of a chain.

Another construction is shown in Figs. 6 and 7 wherein the plates 20 are made with roughened outer surfaces by spurs or members 24 which are driven into the plate and are headed therein.

One important feature of my invention resides in the fact that the fastening device which holds the skid-preventing member to the rim is situated entirely within the limits of the rim and has bearing directly against the inner face of the rim so that all the strain to which the skid-preventing member is subjected is transferred to the rim and not to the spoke.

As stated above the advantage of having the fastening device located entirely within the limits of the rim is that the chain or other skid-preventing member can be readily removed from the wheel without the necessity of removing the fastening device.

It will be observed that the construction of the hook with the eye 7 and the link 18 and hook 13 of the fastening device provides a device in which the chain is loosely held on the tire without any danger of becoming disconnected when in use and which can only be disconnected by first unhooking the link 18 from the hook 13 and then swinging the hook 17 around into the dotted line position indicated in Fig. 3.

Having fully described my invention, what I claim as new and desire to secure by Letters Patent is:

In a device of the class described, the combination with a wheel rim having a tire thereon, of a fastening device having bearing directly against the inner face of the rim and held in position by a spoke, the ends of the fastening device terminating within the planes of the sides of the rim, said fastening device having at one end an offset arm provided with an eye in the offset portion and at the other end a hook, the point of which is directed away from the rim and which is provided with a keeper, a flexible skid-preventing member loosely encircling the rim and tire and having at one end a hook which is hooked into said eye and which faces away from the felly and at the other end a link to engage the hook on the fastening device, said hook of the skid-preventing member being disconnectible from its eye only after the link has been disconnected from the hook of the fastening device.

In testimony whereof, I have signed my name to this specification, in the presence of two subscribing witnesses.

JOHN A. McDONALD.

Witnesses:
LOUIS C. SMITH,
THOMAS J. DRUMMOND.